Dec. 4, 1962 W. E. WEBB 3,067,286

INTERCOMMUNICATION SYSTEM

Filed May 28, 1958 2 Sheets-Sheet 1

INVENTOR.
WILLIS E. WEBB
BY Robert M. Sperry
AGENT

Dec. 4, 1962 W. E. WEBB 3,067,286

INTERCOMMUNICATION SYSTEM

Filed May 28, 1958 2 Sheets-Sheet 2

INVENTOR.
WILLIS E. WEBB
BY Robert M. Sperry
AGENT

United States Patent Office 3,067,286

Patented Dec. 4, 1962

3,067,286
INTERCOMMUNICATION SYSTEM

Willis E. Webb, Claremore, Okla., assignor to Webcom, Incorporated, Oklahoma City, Okla., a corporation of Oklahoma Filed May 28, 1958, Ser. No. 738,445
10 Claims. (Cl. 179—1)

Figure 1:
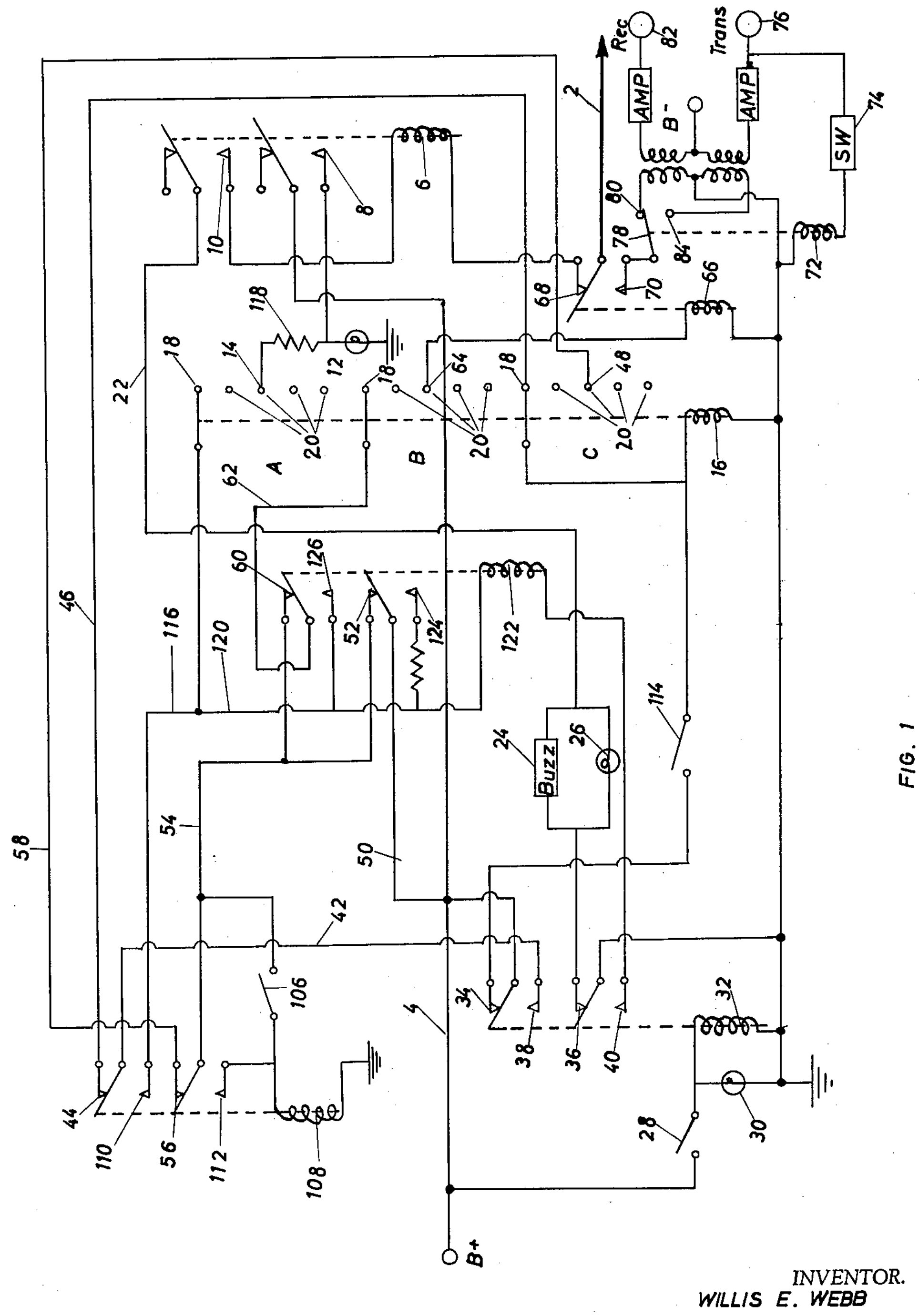

This invention relates to intercommunication systems and is particularly directed to novel automatic audio and visual multistation intercommunication systems.

Intercommunication systems of the type described are frequently employed as nurse calling systems in hospitals and for other similar purposes. In systems of this type, it is necessary that each remote station be able to call to and converse with the central station and that the central station be able to call at will to and converse with any of the remote stations. Moreover, it is generally desirable to provide one or more lamps in convenient locations, such as over the door of the room where the remote station is located and on an annunciator board adjacent the central station, which will light whenever a call is placed to identify the particular remote station making the call.

Numerous intercommunication systems have been suggested heretofore which accomplish this. However, the systems of the prior art have been extremely complicated and expensive. Conventional systems of this type require four switch wires for each remote station plus three common wires. Thus, for a system having one central station and ten remote stations, a total of forty-three wires are required with seven wires running to each of the remote stations. Consequently, the wiring is bulky and complex which makes installation and servicing of the system difficult and costly. Moreover, large conduits are required to house such wiring whereas most older hospitals which were built before such systems were developed are equipped with simple two wire visual communication systems. As a result, the conduits of such hospitals are inadequate for the more modern systems and they must either forego the advantages of the more modern systems or must tear open walls to replace the small conduits. This obviously makes the installation cost of the modern systems prohibitive in many instances.

These disadvantages of prior art automatic audio and visual intercommunication systems are overcome with the present invention and a novel system is provided which accomplishes all of the advantages of the prior art automatic audio and visual systems while retaining the simplicity and inexpensiveness of a two wire system.

Furthermore, the present invention makes it possible for hospitals having only visual systems to obtain the advantages of the automatic audio and visual systems with a minimum of expense and inconveniences. In addition, applicant's novel system includes several fail safe features which are extremely important in case of emergencies, such as power failures, and which are not found even in systems having more complex wiring.

The advantages of the present invention are preferably obtained by employing an extremely simplified circuitry which employs only one switch wire for each remote station plus one common wire. Thus, for the ten station system described above as requiring forty-three wires with seven wires to each station, in prior art systems, applicant's novel system requires merely eleven wires with only two wires to each remote station. Consequently, the cost and complexity of installation and servicing are tremendously reduced.

Accordingly, it is an object of the present invention to provide a novel automatic audio and visual intercommunication system which is simple and inexpensive to install and maintain.

Another object of the present invention is to provide a novel automatic audio and visual intercommunication system having greatly simplified circuitry.

A specific object of the present invention is to provide a novel automatic audio and visual intercommunication system which requires only one switch wire for each remote station plus one common wire.

These and other objects and features of the present invention will be apparent from the following detailed description thereof wherein reference is made to the figures of the accompanying drawing.

Figure 2:
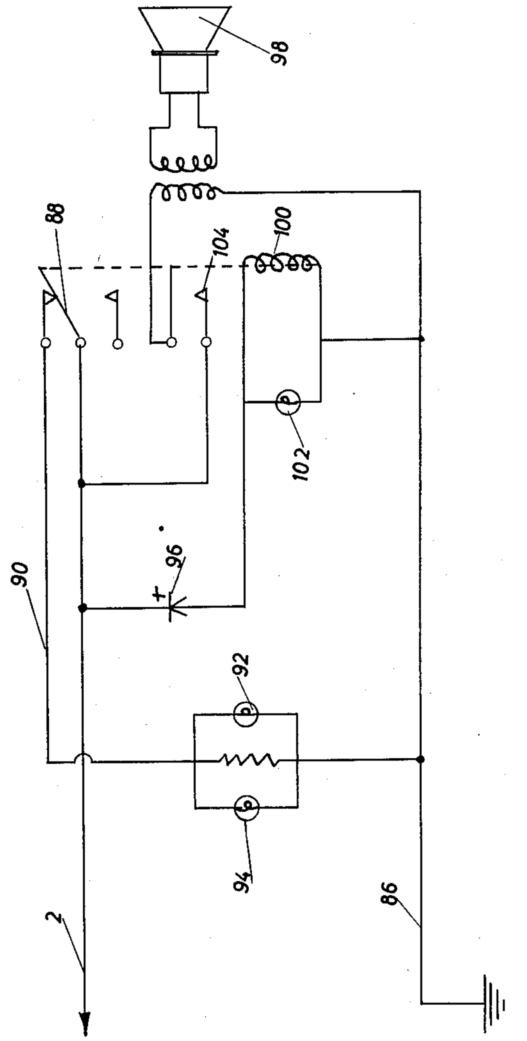

In the drawing:

FIG. 1 is a diagrammatic representation of the circuit of the central station of a typical intercommunication system embodying the present invention; and FIG. 2 is a diagrammatic representation of the circuit of a typical remote station for use with the central station of FIG. 1.

In that form of the present invention chosen for purposes of illustration in the drawing, one central station, as shown in FIG. 1, may be employed with substantially any desired number of remote stations. However, for simplicity, the circuit of FIG. 1 is shown for a four station system. Each of the remote stations will be identical and will embody the circuit of FIG. 2.

When a patient at one of the remote stations wishes to place a call to the nurse at the central station, the patient operates a manual switch on the remote unit by means of a chain or other suitable means. This closes the circuit from switch wire 2 of FIG. 1 to ground and allows positive current to flow from a suitable power source B plus through conductor 4 to energize relay 6 which closes normally open contacts 8 and 10. There is a separate switch wire 2 and relay 6 for each remote station and, when the relay 6 closes contact 8, an identification light 12 is lit to show which remote station is placing the call. Preferably, the light 12 is mounted on a suitable panel in a convenient location adjacent the central station.

Stepping switch 16 comprises three sections A, B and C, each of which has one "rest" position 18 and a number of "station" positions 20 corresponding to the number of remote stations served by the central station.

Closing of contact 10 by relay 6 allows current to flow through conductor 22 to sound a buzzer 24 on the telephone of the central station and to light a "call light" 26 on the telephone to tell the nurse that a call is being received.

To answer the call, the nurse picks up the handset, allowing cradle switch 28 to close. This allows positive current from B plus to light the "answer" light 30 on the telephone of the central station and energizes relay 32 which then opens contacts 34 and 36 and closes contacts 38 and 40. Opening of contact 36 stops the buzzer 24 and extinguishes "call" light 26 while closing of contact 38 allows current from B plus to flow through conductor 42, contact 44 and conductor 46 to energize stepping switch 16. When this occurs, stepping switch 16 moves from the "rest" position 18 and proceeds sequentially from one "station" position 20 to another until a position is reached which corresponds to the station making the call. Such a position is indicated at 48 in section C of stepping switch 16. When this position is reached, positive current from B plus is allowed to flow through conductor 50, contact 52, conductor 54, contact 56 and conductor 58 to deenergize stepping switch 16 and stop its sequential movement. Simultaneously, current flows from conductor 54 through contact 60, conductor 62, and contact 64 in section B of stepping switch 16 to energize relay 66. Relay 66 opens contact 68 and closes contact 70. Opening of contact 68 disconnects B plus thereby deenergizing relay 6 and rearming the "call" circuits. Closing of contact 70 connects the telephone of the central station to switch wire 2 to permit two way audio communication between the nurse at the central station and the patient at the remote station. If a number of calls have been placed at the same time, the stepping switch connects the first call it encounters in its sequential progression. Subsequently, when that call has been completed, the stepping switch moves to the next station and continues in this manner until all calls are answered. The handset is energized with negative current from a suitable power source B minus the central station phone contains a relay coil 72 which is actuated by a voice actuated speaker control 74 connected to the transmitter 76 of the handset of the central station telephone. Relay coil 72 controls a switch 78 which normally closes contact 80 to connect the receiver 82 of the central station telephone to switch wire 2. Thus, when the nurse lifts the handset of the central station telephone, she may first listen to hear what the patient at the remote station wishes to say. When the nurse wants to talk, she merely speaks into the transmitter 76. Her voice will actuate speaker control 74 to energize relay coil 72. This causes switch 78 to move from contact 80 to contact 84 which connects the transmitter 76 to switch wire 2. When the nurse stops talking, switch 78 returns to contact 80 so that the nurse can hear anything that the patient may say. When they have finished talking, the nurse hangs up the handset. This opens switch 28 and returns the circuit to its original condition.

FIG. 2 illustrates the circuit of the remote station and, as stated above, each remote station is identical and is connected to the central station by two wires, a switch wire 2, which is separate for each remote station, and a ground wire 86 which is common to all stations. Switch 88 is normally open but may be closed manually by the patient, by means of a chain or other suitable means, when the patient wishes to call the nurse. As described with respect to FIG. 1, operation of this switch closes a relay 6 at the central station which provides positive current to signal the central station that a call is being received and to identify which remote station is placing the call. This same positive current flows through switch wire 2 to the remote station and thence through switch 88 and conductor 90 to the common ground wire 86. The positive current through conductor 90 lights a lamp 92 adjacent the remote station to signify to the patient that the call has been placed. A second lamp 94 is also lit, preferably at some point such as above the door outside the patient's room, so that the nurse can see that the patient has placed a call even if the nurse is away from the central station.

The positive current signals the central station that a call has been placed. However, a rectifier 96 is provided in the remote unit to prevent the positive current from energizing the speaker 98. As described above, when the nurse lifts the handset, the positive current is disconnected and a negative current flows through the switch wire 2. This negative current can pass rectifier 96 and serves to energize relay 100 and to light lamp 102 which tells the patient that the nurse is listening. Relay 100 closes contact 104 which energizes the speaker 98 and returns switch 88 to its normally open position. Once the speaker 98 has been energized, the patient and the nurse may carry on a two way conversation until the nurse hangs up.

It should be noted that, although switch 88 is normally open, it cannot be returned to the open position without energization of relay 100. Thus, in the event of a temporary power failure, none of the calls placed will be lost. Moreover, applicant's circuit has very low power requirements. The commercial version of applicant's circuit operates successfully with only 12 volts plus and minus. Obviously, such a system is inexpensive to operate and may, if desired, be battery operated.

In some instances, the nurse may desire to originate a call from the central station to one of the remote stations and it may be necessary to override one or more of the incoming calls. To accomplish this, the central station telephone is preferably provided with a dial. Before lifting the handset, the nurse dials the number of the remote station which she wishes to call. As soon as the dial is moved, a dial switch 106 is closed. This allows positive current from conductor 54 to flow through relay 108 which opens contacts 44 and 56 and closes contacts 110 and 112. At the same time, dial pulse switch 114 closes and opens to pass a number of electrical pulses equal to the number dialed. Thus, for example, if the nurse wishes to call remote station #3, she dials three on the telephone dial which causes dial pulse switch 114 to close and open three times. When switch 114, closes, positive current from B plus flows through contact 34 to energize stepping switch 16. Each pulse passed by switch 114 advances the stepping switch one position. If an incoming call has been placed from another remote station, for example, from remote station #2, these pulses will cause the stepping switch 16 to continue past the position for connecting the incoming call. This is accomplished because relay 108 has been actuated by dial switch 106 to open contact 56. Consequently, the circuit through section C of stepping switch 16 cannot be completed to stop the stepping switch.

When the desired station has been dialed, the nurse lifts the handset which closes the cradle switch 28 and allows positive current to energize relay 32 which opens contacts 34 and 36 and closes contacts 38 and 40. Current then flows from B plus through contact 38, conductor 42, contact 110 and conductor 116. Part of this current flows through section A of stepping switch 16 and resistor 118 to make identification light 12 burn at reduced brilliance. Thus, even if several lights are lit for incoming calls, the nurse can tell at a glance which station she is connected with. Another part of the current in conductor 116 flows through conductor 120 to energize relay 122. Relay 122 opens contacts 52 and 60 and closes contacts 124 and 126. When this happens, relay 108 is deenergized and returns to its normal position. At the same time, current from B plus flows through conductor 50 and contact 124 to lock relay 122 in position. Current also flows through contact 126, conductor 62 and section B of stepping switch 16 to energize relay 66 which closes contact 70 to connect the central station telephone to the selected remote station. Thereafter, the nurse and the patient at the selected remote station can hold a two way conversation in the same manner described above.

Numerous variations and modifications of this intercommunication system may obviously be made without departing from the invention. Accordingly, it should be clearly understood that the form of the invention described above and shown in the figures of the accompanying drawing are illustrative only and are not intended to limit the scope of the invention.

I claim:

1. An intercommunication system comprising a central station, a remote station, one switch wire connecting said remote station to said central station, a common ground wire also connecting said remote station to said central station, a source of first voltage located in said central station, a source of second voltage of polarity opposite that of said first voltage also located in said central station, signalling means located in said central station, a manual switch located in said remote station and operable to complete a first circuit including said switch wire and said ground wire to connect said source of first voltage to actuate said signalling means, a speaker located in said remote station, a telephone located in said central station, said telephone having a handset and a cradle, relay means operable upon receipt of a signal from said signalling means and actuated by lifting of said handset from said cradle to disconnect said signalling means from said first voltage, and switch means operable upon lifting of said handset from said cradle to complete a second circuit including said switch wire and said ground wire to connect said source of second voltage to energize said speaker and said handset for audio communication.

2. An intercommunication system comprising a central station, a remote station, one switch wire connecting said remote station to said central station, a common ground wire also connecting said remote station to said central station, a source of first voltage located in said central station, a source of second voltage of polarity opposite that of said first voltage also located in said central station, signalling means located in said central station, a manual switch located in said remote station and operable to complete a first circuit including said switch wire and said ground wire to connect said source of first voltage to actuate said signalling means, a speaker located in said remote station, a telephone located in said central station, said telephone having a handset and a cradle, relay means operable upon receipt of a signal from said signalling means and actuated by lifting of said handset from said cradle to disconnect said signalling means from said first voltage, switch means operable upon lifting of said handset from said cradle to complete a second circuit including said switch wire and said ground wire to connect said source of second voltage to energize said speaker and said handset for two-way audio communication, and voice operated means in said telephone to switch said handset from receiving to transmitting.

3. An intercommunication system comprising a central station a remote station, one switch wire connecting said remote station to said central station, a common ground wire also connecting said remote station to said central station, a source of first voltage located in said central station, a source of second voltage of polarity opposite that of said first voltage also located in said central station, signalling means located in said central station, a manual switch located in said remote station and operable to complete a first circuit including said switch wire and said ground wire to connect said source of first voltage to actuate said signalling means, a speaker located in said remote station, a telephone located in said central station, said telephone having a handset and a cradle, relay means operable upon receipt of a signal from said signalling means and actuated by lifting of said handset from said cradle to disconnect said signalling means from said first voltage, switch means operable upon lifting of said handset from said cradle to complete a second circuit including said switch wire and said ground wire to connect said source of second voltage to energize said speaker and said handset for two-way audio communication, voice operated means in said telephone to switch said handset from receiving to transmitting, and means on said telephone operable to originate a call to said remote station.

4. An intercommunication system comprising a central station, a plurality of remote stations, single independent switch wires connecting each of said remote stations to said central station, a common ground wire connecting all of said remote stations to said central station, a source of first voltage located in said central station, a source of second voltage of polarity opposite that of said first voltage also located in said central station, signalling means located in said central station, a manual switch located in each of said remote stations, each of said manual switches being operable to complete a first circuit between said central station and the respective remote station, said first circuit including the respective switch wire for the remote station placing the call and said ground wire and serving to connect said source of first voltage to actuate said signalling means to identify the respective remote station originating the call, a speaker located in each of said remote stations, a telephone located in said central station, said telephone having a handset and a cradle, relay means operable upon receipt of a signal from said signalling means and actuated by lifting of said handset from said cradle to disconnect said signalling means from said first voltage, and switch means operable upon lifting of said handset from said cradle to complete a second circuit between said central station and the remote station originating the call, said second circuit including the respective switch wire for the remote station placing the call and said ground wire and serving to connect said source of second voltage to energize said speaker and said handset for audio communication.

5. An intercommunication system comprising a central station, a plurality of remote stations, single independent switch wires connecting each of said remote stations to said central station, a common ground wire connecting all of said remote stations to said central station, a source of first voltage located in said central station, a source of second voltage of polarity opposite that of said first voltage also located in said central station, signalling means located in said central station, a manual switch located in each of said remote stations, each of said manual switches being operable to complete a first circuit between said central station and the respective remote station, said first circuit including the respective switch wire for the remote station placing the call and said ground wire and serving to connect said source of first voltage to actuate said signalling means to identify the respective remote station originating the call, a speaker located in each of said remote stations, a telephone located in said central station, said telephone having a handset and a cradle, relay means operable upon receipt of a signal from said signalling means and actuated by lifting of said handset from said cradle to disconnect said signalling means from said first voltage, switch means operable upon lifting of said handset from said cradle to complete a second circuit between said central station and the remote station originating the call, said second circuit including the respective switch wire for the remote station placing the call and said ground wire and serving to connect said source of second voltage to energize said speaker and said handset for audio communication, and means on said telephone operable to originate a call to any selected remote station.

6. An intercommunication system comprising a central station a plurality of remote stations, single independent switch wires connecting each of said remote stations to said central station, a common ground wire connecting all of said remote stations to said central station, a source of first voltage located in said central station, a source of second voltage of polarity opposite that of said first voltage also located in said central station, signalling means located in said central station, a manual switch located in each of said remote stations, each of said manual switches being operable to complete a first circuit between said central station and the respective remote station, said first circuit including the respective switch wire for the remote station placing the call and said ground wire and serving to connect said source of first voltage to actuate said signalling means to identify the respective remote station originating the call, a speaker located in each of said remote stations, a telephone located in said central station, said telephone having a handset and a cradle, relay means operable upon receipt of a signal from said signalling means and actuated by lifting of said handset from said cradle to disconnect said signalling means from said first voltage, switch means operable upon lifting of said handset from said cradle to complete a second circuit between said central station and the remote station originating the call, said second circuit including the respective switch wire for the remote station placing the call and said ground wire and serving to connect said source of second voltage to energize said speaker and said handset for audio communication, and dial means on said telephone operable to override incoming calls to originate a call to any selected remote station.

7. An intercommunication system comprising a central station. A plurality of remote stations each having a speaker; single independent switch wires connecting each of said remote stations to said central station; a common ground wire connecting all of said remote stations to said central station; a source of positive voltage located in said central station; a manual switch located in each of said remote stations; each of said manual switches being operable to complete a first circuit; said first circuit including said source of positive voltage, said common ground wire and the respective switch wire for the remote station placing the call; signalling means located at said central station and responsive to completion of said first circuit to indicate which of said remote stations is placing the call; a telephone located at said central station and having a handset and a cradle; a stepping switch located at said central station; means responsive to lifting of said handset from said cradle to advance said stepping switch to a position corresponding to the particular remote station placing the call; a source of negative voltage located at said central station; transmitting and receiving means included in the handset of said telephone and energized by said source of negative voltage; and switch means at said central station operable upon said stepping switch reaching said position to disconnect said first circuit and to complete a second circuit to permit two way audio communication between said central station and the remote station placing the call; said second circuit including said source of negative voltage, said transmitting and receiving means, said common ground wire, said respective switch wire for the remote station placing the call, and the speaker of the remote station placing the call.

8. An intercommunication system comprising a central station; a plurality of remote stations each having a speaker; single independent switch wires connecting each of said remote stations to said central station; a common ground wire connecting all of said remote stations to said central station; a source of positive voltage located in said central station; a manual switch located in each of said remote stations; each of said manual switches being operable to complete a first circuit; said first circuit including said source of positive voltage, said common ground wire and the respective switch wire for the remote station placing the call; signalling means located at the central station and responsive to completion of said first circuit to indicate which of said remote stations is placing the call; a telephone located at said central station and having a handset and a cradle; a stepping switch located at said central station; means responsive to lifting of said handset from said cradle to advance said stepping switch to a position corresponding to the particular remote station placing the call; a source of negative voltage located at said central station; transmitting and receiving means included in the handset of said telephone and energized by said source of negative voltage; switch means at said central station operable upon said stepping switch reaching said position to disconnect said first circuit and to complete a second circuit to permit two way audio communication between said central station and the remote station placing the call; said second circuit including said source of negative voltage, said transmitting and receiving means, said common ground wire, said respective switch wire for the remote station placing the call, and the speaker of the remote station placing the call; and voice operated switch means included in said telephone to switch from a receiving position to a transmitting position.

9. An intercommunication system comprising a central station; a plurality of remote stations each having a speaker; single independent switch wires connecting each of said remote stations to said central station; a common ground wire connecting all of said remote stations to said central station; a source of positive voltage located in said central station; a manual switch located in each of said remote stations; each of said manual switches being operable to complete a first circuit; said first circuit including said source of positive voltage, said common ground wire and the respective switch wire for the remote station placing the call; signalling means located at the central station and responsive to completion of said first circuit to indicate which of said remote stations is placing the call; a telephone located at said central station and having a handset and a cradle; a stepping switch located at said central station; means responsive to lifting of said handset from said cradle to advance said stepping switch to a position corresponding to the particular remote station placing the call; a source of negative voltage located at said central station; transmitting and receiving means included in the handset of said telephone and energized by said source of negative voltage; switch means at said central station operable upon said stepping switch reaching said position to disconnect said first circuit and to complete a second circuit to permit two way audio communication between said central station and the remote station placing the call; said second circuit including said source of negative voltage, said transmitting and receiving means, said common ground wire, said respective switch wire for the remote station placing the call, and the speaker of the remote station placing the call; and means responsive to completion of said second circuit to return said manual switch to its open position.

10. An intercommunication system comprising a central station; a plurality of remote stations each having a speaker; single independent switch wires connecting each of said remote stations to said central station; a common ground wire connecting all of said remote stations to said central station; a source of positive voltage located in said central station; a manual switch located in each of said remote stations; each of said manual switches being operable to complete a first circuit; said first circuit including said source of positive voltage, said common ground wire and the respective switch wire for the remote station placing the call; signalling means located at said central station and responsive to completion of said first circuit to indicate which of said remote stations is placing the call; a telephone located at said central station and having a handset and a cradle; a stepping switch located at said central station; means responsive to lifting of said handset from said cradle to advance said stepping switch to a position corresponding to the particular remote station placing the call; a source of negative voltage located at said central station; transmitting and receiving means included in the handset of said telephone and energized by said source of negative voltage; switch means at said central station operable upon said stepping switch reaching said position to disconnect said first circuit and to complete a second circuit to permit two way audio communication between said central station and the remote station placing the call; said second circuit including said source of negative voltage, said transmitting and receiving means, said common ground wire, said respective switch wire for the remote station placing the call, and the speaker of the remote station placing the call; and means responsive to completion of said second circuit to return said manual switch to its open position; and dial means on said telephone operable to advance said stepping switch to any selected position to override incoming calls and to complete said second circuit between said central station and any desired remote station.

References Cited in the file of this patent

UNITED STATES PATENTS

| | | |
|---|---|---|
| 2,064,186 | Voss | Dec. 15, 1936 |
| 2,530,943 | Duhnkrack | Nov. 21, 1950 |
| 2,740,842 | Schneider | Apr. 3, 1956 |
| 2,744,966 | Bernstein | May 8, 1956 |
| 2,830,127 | Ferguson et al. | Apr. 8, 1958 |